(12) United States Patent
Schall

(10) Patent No.: US 10,935,208 B2
(45) Date of Patent: Mar. 2, 2021

(54) LIGHTING DEVICE FOR VEHICLES

(71) Applicant: HELLA GMBH & CO. KGaA, Lippstadt (DE)

(72) Inventor: Hans-Christian Schall, Bad Lippspringe (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/448,850

(22) Filed: Jun. 21, 2019

(65) Prior Publication Data
US 2019/0309923 A1    Oct. 10, 2019

Related U.S. Application Data

(63) Continuation of application No. PCT/EP2017/083196, filed on Dec. 18, 2017.

(30) Foreign Application Priority Data

Dec. 21, 2016 (DE) ..................... 10 2016 125 215.8

(51) Int. Cl.
| | |
|---|---|
| *F21S 43/237* | (2018.01) |
| *F21S 43/247* | (2018.01) |
| *F21S 43/14* | (2018.01) |
| *F21S 43/27* | (2018.01) |
| *F21S 43/245* | (2018.01) |
| *F21S 45/47* | (2018.01) |
| *F21V 8/00* | (2006.01) |

(52) U.S. Cl.
CPC .............. *F21S 43/237* (2018.01); *F21S 43/14* (2018.01); *F21S 43/245* (2018.01); *F21S 43/247* (2018.01); *F21S 43/27* (2018.01); *F21S 45/47* (2018.01); *G02B 6/0006* (2013.01)

(58) Field of Classification Search
None
See application file for complete search history.

(56) References Cited

U.S. PATENT DOCUMENTS

| | | | |
|---|---|---|---|
| 8,727,574 B2 | 5/2014 | Simchak et al. | |
| 10,222,515 B2 | 3/2019 | Heinemann et al. | |
| 2003/0081423 A1 | 5/2003 | Shinji et al. | |
| 2004/0208019 A1 | 10/2004 | Koizumi et al. | |

(Continued)

FOREIGN PATENT DOCUMENTS

| | | |
|---|---|---|
| CN | 204880001 U | 12/2015 |
| CN | 205372346 U | 7/2016 |

(Continued)

OTHER PUBLICATIONS

International Search Report dated Mar. 2, 2018 in corresponding application PCT/EP2017/083196.

*Primary Examiner* — Elmito Breval
(74) *Attorney, Agent, or Firm* — Muncy, Geissler, Olds & Lowe, P.C.

(57) ABSTRACT

A lighting device for vehicles with an elongate optical waveguide, with a light source associated with a first end of the optical waveguide, with a carrier plate bearing the light source and with a holder which is connected to the optical waveguide in an end region, wherein the optical waveguide is provided with an opaque casing at least in the end region, which has at least one fastener via which the optical waveguide is fastened to the holder.

10 Claims, 3 Drawing Sheets

(56) References Cited

U.S. PATENT DOCUMENTS

2012/0140481 A1* 6/2012 Simchak ................. F21S 43/14
                                                    362/296.07
2015/0146433 A1* 5/2015 Suzuki .................... F21V 5/04
                                                    362/311.01

FOREIGN PATENT DOCUMENTS

| DE | 102009010510 A1 | 10/2009 |
| DE | 102010046342 A1 | 3/2012 |
| DE | 102012109422 A1 | 4/2014 |
| DE | 102014116517 A1 | 5/2016 |
| JP | 2015034006 A | 2/2015 |
| JP | 2016040779 A | 3/2016 |
| WO | WO2012040280 A2 | 3/2012 |

* cited by examiner

LIGHTING DEVICE FOR VEHICLES

This nonprovisional application is a continuation of International Application No. PCT/EP2017/083196, which was filed on Dec. 18, 2017, and which claims priority to German Patent Application No. 10 2016 125 215.8, which was filed in Germany on Dec. 21, 2016, and which are both herein incorporated by reference.

BACKGROUND OF THE INVENTION

Field of the Invention

The present invention relates to a lighting device for vehicles with an elongate optical waveguide, with a light source associated with a first end of the elongate optical waveguide, with a carrier plate bearing the light source and with a holder connected to the elongate optical waveguide in an end region.

Description of the Background Art

From DE 10 2012 109 422 A1, a lighting device for vehicles with an elongate optical waveguide is known, which is fastened to a holder on a side facing a light source. This holder is firmly connected to a carrier plate bearing the light source. The elongate optical waveguide has in the end region a circumferential collar which engages behind an opening edge of the holder.

In the conventional art, however, since the holder and the carrier plate or a heat sink adjoining the carrier plate cannot completely shade the end region of the optical waveguide, scattered light emitted by the light source can escape to the side, which leads to an undesirable thermal appearance of the lighting device. Also, the laterally shaped collar can lead to photometrical losses which have a negative effect on the light output of the lighting device. Furthermore, the light extraction of the optical waveguide via the collar into the holder can lead to thermal damage to the holder.

SUMMARY OF THE INVENTION

It is therefore an object of the present invention to develop a lighting device for vehicles with an elongate optical waveguide in such a way that, in a simple manner, scattered light emitted by an optical waveguide cannot escape into the surrounding area outside the lighting device.

In an exemplary embodiment, the elongate optical waveguide is provided at least in the end region with an opaque casing having a fastener via which the elongate optical waveguide is fastened to the holder.

At least in an end region facing the light source, the elongate optical waveguide is surrounded with an opaque casing which has at least one fastener for fastening to a holder which serves to support an end region of the optical waveguide facing the light source relative to the light source. Since a circumferential surface of the optical waveguide is completely enclosed in the end region, this reliably prevents scattered light from escaping from the optical waveguide. An unwanted thermal appearance of the lighting device can thus be avoided. At the same time, scattering losses in the coupling region of the optical waveguide in which light is coupled from the light source into the optical waveguide can also be minimized since, for example, no locking protrusions must be formed on the optical waveguide for direct locking of the optical waveguide to the holder so as to attach the optical waveguide to the holder.

The opaque casing can be firmly connected to the optical waveguide. This ensures that undesired slippage and possibly exposure of the end region of the optical waveguide occurs.

The opaque casing can be connected in one piece with the optical waveguide, or fixedly connected as a casing part to the optical waveguide. The casing can be made, for example, by two-component injection molding on the one hand or by injection molding of two parts and subsequent welding thereof on the other hand. Advantageously, this can simplify the assembly of the lighting device. Alternatively, the casing may also be provided as a casing part which is separate from the optical waveguide and which is fastened on the optical waveguide. The casing, together with the optical waveguide, forms a common structural unit which is fastened to the holder.

The casing part can be formed in one piece, wherein a film hinge is provided in a first connection region between casing part segments. By means of the film hinge, the casing part segments are pivotable relative to each other, so that the casing part can be placed around the optical waveguide. For attaching the casing part to the optical waveguide, clamping, latching and/or screw elements can be provided in a second connection region at free ends of the casing part segments, wherein by means of their clamping, latching and/or screwing, the casing part is fixed to the optical waveguide. The advantage here is that as a joint, the hinge is not translucent or light permeable, so that passage of scattered light is prevented.

The casing part may be formed in two segments, wherein a first casing part segment can be connected to a second casing part segment via a latching mechanism. The latching can be carried out by overlapping corresponding latching elements of the first casing part segment or the second casing part segment, so that the passage of scattered light is reliably avoided.

The fastener of the casing can be formed as one or more latching elements. These are designed such that they can enter into a latching connection with a latching arm of the holder. In this way, a position-safe arrangement of the end region of the optical waveguide to the light source is ensured.

The casing on an inner side can have a recess into which a rib of the optical waveguide engages for stationary mounting of the optical waveguide to the casing. The rib can extend in the longitudinal and/or transverse direction to the longitudinal extension of the optical waveguide. Preferably, the rib may form an injection molding lip of the optical waveguide. As a result, the assembly effort can advantageously be reduced, or the casing can be brought into a defined mounting position with the optical waveguide.

A first end of the optical waveguide can project in front of an edge of the casing likewise facing the light source, so that the first end can be inserted in a receiving groove that is offset to a base body of the holder. The receiving groove serves as an abutment for the engagement of the optical waveguide/casing assembly on the holder. This way, a clear relative position of the first end or end face of the optical waveguide to the light source can be set. The distance between the end face of the optical waveguide and the light source should not fall below a permissible minimum, so that any photometrical losses or thermal damage to the optical waveguide by the light source can be avoided.

The casing can have a flange ring on a side facing away from the first end of the optical waveguide for receiving an edge of an extension casing. Advantageously, this way a larger area of the optical waveguide can be covered opaquely, which prevents the emission of scattered light from the optical waveguide over a greater length range.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
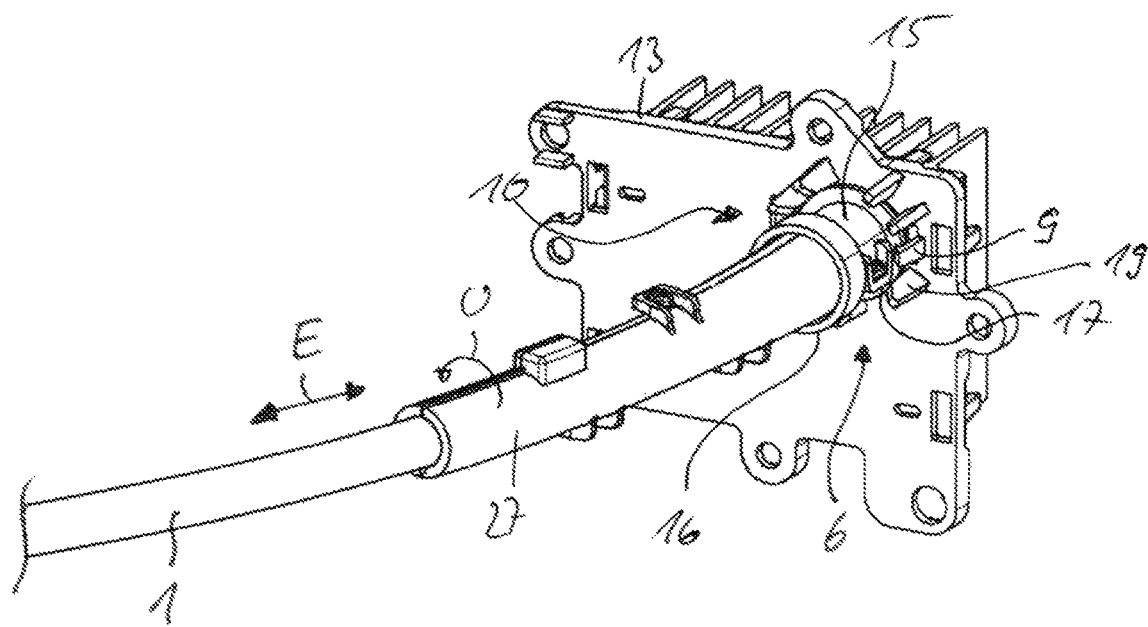
FIG. 1 is a front perspective view of a lighting device according to the invention in a connection region of an elongate optical waveguide to a light source.

A lighting device according to the invention for vehicles can be used, for example, as a headlight in the front region of a vehicle. Alternatively, the lighting device can also be designed as a tail light in the vehicle or as an interior light in the vehicle interior.

According to a first embodiment of the invention according to FIGS. 1 to 4, the lighting device has an elongate transparent optical waveguide 1, which is circular or ellipsoidal in cross section. At a first end 2 of the optical waveguide 1, the latter is assigned to a light source 3, which couples light into an end face 4 of the optical waveguide 1. By total reflection on a circumferential surface 5 of the optical waveguide 1, the light is transmitted in the extension direction E of the optical waveguide 1 until it is coupled out at optical elements arranged in the extension direction E of the optical waveguide 1 to produce a predetermined light distribution, for example, a daytime running light distribution or the like. The optical waveguide 1 may be associated with an optical unit in order to shape the light in the desired manner.

In an end region 6 of the optical waveguide 1 in which the first end 2 of the same is arranged, the optical waveguide 1 abuts a contact surface of a holder 7 so that the end face 4 of the optical waveguide 1 is stationary and arranged in a fixed relative position to the light source 3. The holder 7 is plate-shaped with a plate-shaped base body 8, from which latching arms 9 protrude on a side facing the optical waveguide 1 for a latching connection with an opaque casing 10, which casing completely surrounds the peripheral surface 5 of the optical waveguide 1 in the end region 6 or the connection region of the optical waveguide 1 to the holder 7. For this purpose, as a fastener, the casing 10 has radially projecting latching elements 11 which are arranged distributed in the circumferential direction U of the optical waveguide 1. In the assembly position, the elastically formed latching arms 9 of the holder 7 engage behind the latching elements 11 of the casing 10, see FIG. 4.

On a side facing away from the optical waveguide 1, the holder 7 has further latching arms 12 for the clamped retention of a heat sink 13, which is arranged on a rear side of a carrier plate 14 bearing the light source 3. The carrier plate 14 is preferably fixedly connected to the heat sink 13.

The casing 10 is preferably formed of a plastic material. The casing 10 is firmly connected to the optical waveguide 1. The casing 10 is hollow-cylindrical and completely surrounds the optical waveguide 1 in the end region 6 or the fastening region in the circumferential direction U.

In order to attach the casing 10 to the optical waveguide 1, the casing 10 may be formed as a two-part casing part comprising a first casing part segment 15 and a second casing part segment 16, see FIG. 1. The two casing part segments 15, 16 can each have the same size, wherein they are each semicircular in cross section.

For mounting on the light conductor 1, the two casing part segments 15, 16 are placed radially on the optical waveguide 1 and are connected with one another by a latching mechanism 17. As a result, the casing part or casing 10 thus formed bears on the circumferential surfaces 5 of the optical waveguide 1 in a clamping manner. Alternatively, or additionally, the first casing part segment 15 and the second casing part segment 16 can also be connected to one another by a screw connection.

Figure 2:
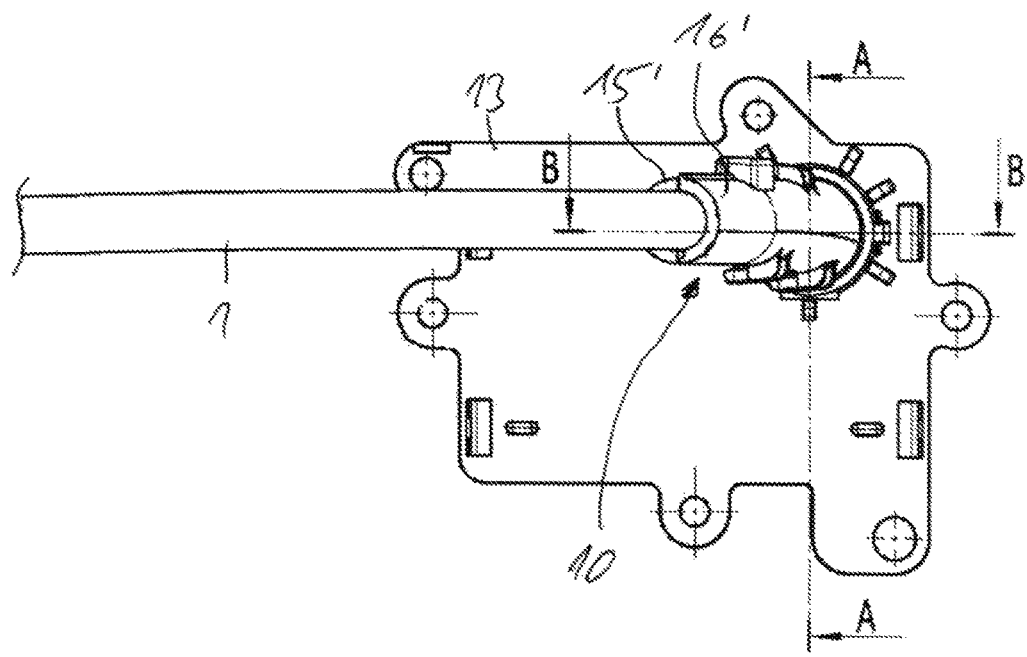
FIG. 2 is a front view of the connection region of the optical waveguide to the light source.
Figure 3:
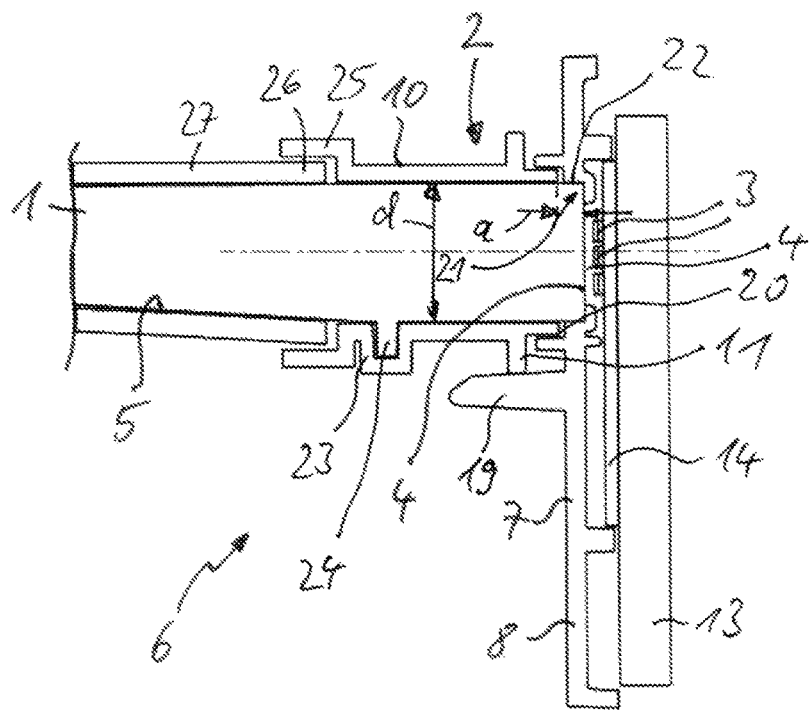
FIG. 3 is a section through the connection region according to FIG. 2 along the section line A-A.
Figure 4:
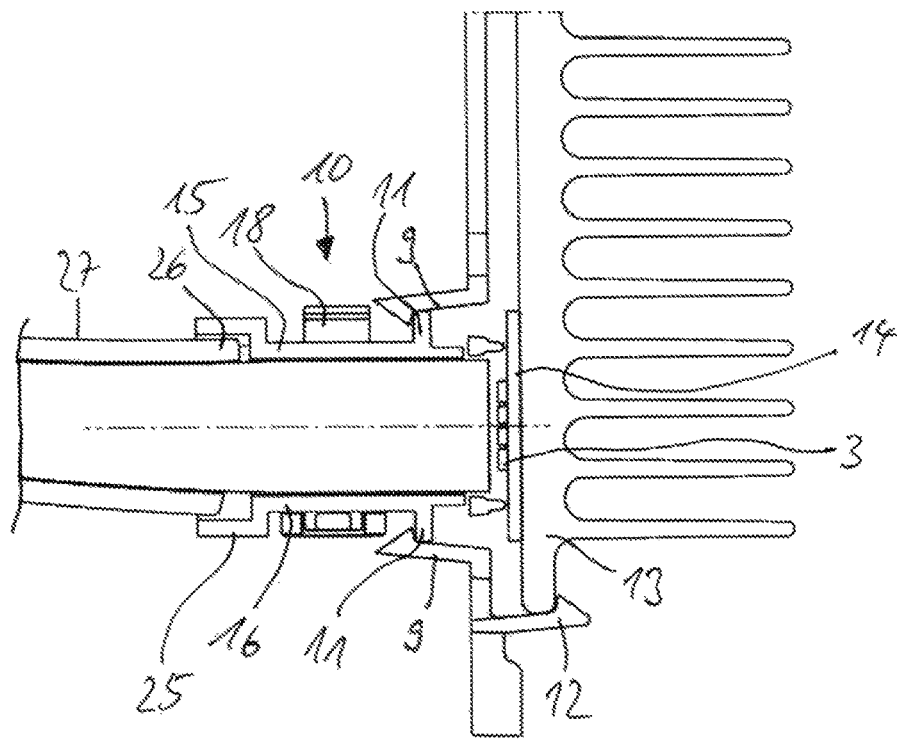
FIG. 4 is a section through the connection region according to FIG. 2 along the section line B-B.

According to the embodiment shown in FIGS. 2 to 4, a first casing part segment 15' is connected by a film hinge 18 to a second casing part segment 16' so that the casing part or the casing 10 is formed integrally.

The holder 7 can have a number of guide ribs 19 distributed in the circumferential direction U so that the light assembly consisting of the optical waveguide 1 and the casing 10 can be moved in the axial direction to the holder 7 until the latching of the latching arms 9 of the holder 7 and the latching elements 11 of the casing 10 takes place.

In order for the end face 4 of the optical waveguide 1 to be arranged at a defined distance to the light sources 3, a ring-shaped edge 20 of the casing 10 facing the light source 3 or the end face 4 is arranged at a distance a to the end face 4. The distance a is greater than the depth of a receiving groove 21 of the holder 7 so that only the first end 2 of the optical waveguide 1 can engage in the receiving groove 21. The receiving groove 21 has a diameter of a ring wall 22 tailored to the diameter d of the optical waveguide 1 such that the first end 2 of the optical waveguide 1 can be inserted with play in the receiving groove 21.

In order for the casing 10 or the casing part to be fastened to the optical waveguide 1 while maintaining the distance a from the end face 4, the casing 10 has a recess 23 on an inner side into which a rib 24 of the optical waveguide 1 engages. The recess 23 or the rib 24 can extend in the circumferential direction U of the optical waveguide 1 or in the extension direction E of the optical waveguide 1 in the shape of a partial circle. The rib 24 can also serve, for example, as an injection molding rib of the optical waveguide 1.

The receiving groove 21 serves as a contact surface for the end face 4 of the optical waveguide 1 and effectively forms an abutment for the latching of the assembly consisting of the optical waveguide 1 and the casing 10. In particular, it can be avoided that the distance between the end face 4 of the optical waveguide 1 and the light source 3 falls below the permissible minimum.

According to an alternative embodiment of the invention, the casing 10 may optionally be formed for a single optical waveguide 1 or for a plurality of optical waveguides.

On a side facing away from the first end 2 of the optical waveguide 1, the casing 10 has a flange ring 25 which serves to receive an edge 26 of an extension casing 27. The flange ring 25 has a larger diameter as compared to the remaining portion of the casing 10 so that the edge 26 of the extension casing 27 can engage and is held in a secure position on the casing 10.

The light source 3 is preferably designed as a semiconductor-based light source, preferably an LED light source, wherein in the present embodiment, a plurality of LED light sources is arranged on the carrier plate 14. The light sources 3 are arranged on a side of the carrier plate 14 facing the end face of the optical waveguide 1.

The same components or component functions are provided with the same reference numerals.

Figure 5:
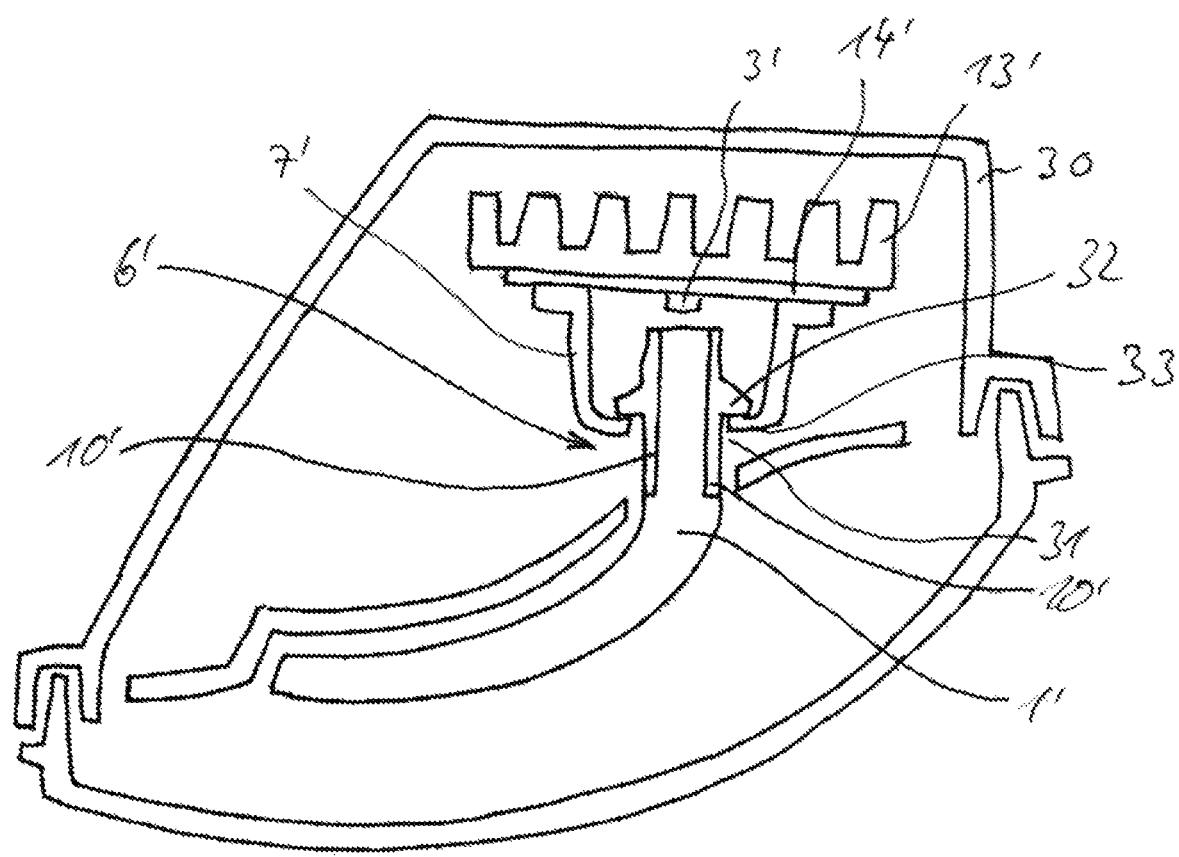
FIG. 5 is a plan view of a lighting device with a connection region between the optical waveguide and the light source according to an alternative embodiment.

According to a further embodiment of the invention according to FIG. 5, a lighting device with an optical waveguide 1' is arranged within a housing 30 of the lighting device. A light source 3' is positioned on a carrier plate 14', which is connected to a heat sink 13'. A holder 7' rises bell-shaped from the carrier plate 14' to form an opening 31 into which a first end 2' of the optical waveguide 1' provided with a casing 10' engages and is fastened to the holder 7'. For this purpose, the casing 10' has a circumferential collar 32, which engages behind a receiving edge 33 of the holder 7'.

So that no scattered radiation can escape from the optical waveguide 1 in the thus formed end region 6', the optical waveguide 1' is surrounded by the opaque casing 10' which is connected in one piece to the optical waveguide 1'.

For example, the opaque casing 10' and the optical waveguide 1' may be manufactured by a two-component injection molding process. Alternatively, the casing 10' and the optical waveguide 1' may be manufactured separately as injection-molded parts, after which they are joined together by welding. As can be seen from FIG. 5, the optical waveguide 1' has a smaller diameter in the end region 6' than in its remaining portion. The optical waveguide 1' is formed in the end region 6' with a reduced diameter, wherein the casing 10' extends flush with the remaining part of the optical waveguide 1'. Only the collar 32 protrudes radially from the optical waveguide assembly thus formed.

While the optical waveguide 1, 1' and the casing 10, 10' are of cylindrical design in the end region 6, 6', the optical waveguide 1, 1' can also be plate-shaped or have another shape in its remaining portion comprising the light outcoupling surface.

The holder 7, 7' may also be connected to the heat sink 13 or another body, instead of to the carrier plate 14. It is essential that the holder is connected to a body which is arranged in a fixed local relative position to the light source 3, 3'.

Whereas the optical waveguide 1 or 1' consists of a transparent material, the casing 10, 10' consists of a non-transparent material.

It is understood that the aforementioned features can be used alone or as a plurality in any combination.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a vehicle, the lighting device comprising:
    an elongate optical waveguide;
    a light source assigned to a first end of the optical waveguide;
    a carrier plate bearing the light source; and
    a holder connected to the optical waveguide in an end region,
    wherein the optical waveguide, at least in the end region, is provided with an opaque casing that has at least one fastener via which the optical waveguide is fastened to the holder,
    wherein an edge of the casing facing the first end of the optical waveguide is arranged spaced from a distal end face of the optical waveguide at the first end, and
    wherein the holder has a receiving groove which is offset in an axial direction to a base body of the holder, the receiving groove abutting with the distal end face of the optical waveguide to maintain the first end of the optical waveguide in alignment with the light source, such that the distal end face of the first end of the optical waveguide opposes the light source, in a light transmitting direction, with a gap being maintained between the distal end face and the light source.

2. The lighting device according to claim 1, wherein the casing completely surrounds a peripheral surface of the optical waveguide in the end region.

3. The lighting device according to claim 1, wherein the casing is fixedly connected to the optical waveguide.

4. The lighting device according to claim 1, wherein the casing is integrally connected to the optical waveguide or fixedly connected as a casing part to the optical waveguide.

5. The lighting device according to claim 1, wherein the at least one fastener of the casing is formed as a plurality of latching elements that are connectable with a latching arm of the holder.

6. The lighting device according to claim 1, wherein the casing, on one inner side, has a recess in which a rib of the optical waveguide engages for a stationary retention of the optical waveguide with the casing.

7. The lighting device according to claim 1, wherein on a side facing away from the first end of the optical waveguide, the casing has a flange ring for receiving an extension casing.

8. The lighting device according to claim 1, wherein the distal end face of the first end of the optical waveguide opposes the light source, in the light transmitting direction, with the gap being maintained between the distal end face and the light source, such that light exiting the light source first passes through the gap before entering into the optical waveguide.

9. A lighting device for a vehicle, the lighting device comprising:
    an elongate optical waveguide;
    a light source assigned to a first end of the optical waveguide;
    a carrier plate bearing the light source; and
    a holder connected to the optical waveguide in an end region,
    wherein the optical waveguide, at least in the end region, is provided with an opaque casing that has at least one fastener via which the optical waveguide is fastened to the holder,
    wherein the casing is integrally connected to the optical waveguide or fixedly connected as a casing part to the optical waveguide, and
    wherein the casing part is formed integrally with a first casing part segment and a second casing part segment, which are interconnected in a first connection region by a film hinge, wherein the first casing part segment and the second casing part segment surround the optical waveguide in abutment with a peripheral surface of the optical waveguide, wherein in a second connection region, the first casing part segment is non-positively and/or positively connected to the second casing part segment.

10. A lighting device for a vehicle, the lighting device comprising:
- an elongate optical waveguide;
- a light source assigned to a first end of the optical waveguide;
- a carrier plate bearing the light source; and
- a holder connected to the optical waveguide in an end region,
- wherein the optical waveguide, at least in the end region, is provided with an opaque casing that has at least one fastener via which the optical waveguide is fastened to the holder,
- wherein the casing is integrally connected to the optical waveguide or fixedly connected as a casing part to the optical waveguide, and
- wherein the casing part is formed in two parts with a first casing part segment and a second casing part segment, wherein the first casing part segment is connected with the second casing part segment via a latching mechanism.

* * * * *